United States Patent [19]

Sallee et al.

[11] Patent Number: 4,971,631
[45] Date of Patent: Nov. 20, 1990

[54] COMPOSITIONS AND METHODS FOR CLEANING HARD SURFACES

[75] Inventors: Kevin D. Sallee, Tempe; Daniel L. Doolan, Mesa, both of Ariz.

[73] Assignee: Bernard Lietaer, Belgium

[21] Appl. No.: 164,920

[22] Filed: Mar. 7, 1988

[51] Int. Cl.$^5$ ............... C23G 1/02; B08B 3/08; C11D 7/08
[52] U.S. Cl. ........................................ 134/3; 134/41; 252/136; 252/139; 252/140; 252/144
[58] Field of Search ............... 134/3, 28, 41; 252/136, 252/139, 140, 144

[56] References Cited

U.S. PATENT DOCUMENTS

| 602,519 | 4/1898 | Postlethwaite | 252/144 |
|---|---|---|---|
| 887,062 | 5/1908 | Camors | 252/80 |
| 1,011,203 | 12/1911 | Jahn | 134/28 |
| 1,066,720 | 7/1913 | Ellis | 252/144 |
| 1,069,056 | 7/1913 | Ellis | 252/144 |
| 1,345,819 | 7/1920 | Wolfe | 252/144 |
| 1,428,084 | 9/1922 | Gravell | 252/144 |
| 1,484,444 | 2/1924 | MacNaull | 252/144 |
| 1,695,693 | 12/1928 | Ladislaus | 252/144 |
| 2,223,168 | 11/1940 | Dombrow et al. | 99/103 |
| 2,680,678 | 5/1972 | Fox | 41/42 |
| 3,275,560 | 9/1966 | Wasserman | 252/136 |
| 3,666,559 | 5/1972 | Dorricone | 134/3 |
| 3,681,141 | 8/1972 | Muolo | 134/41 |
| 3,729,423 | 4/1973 | Hirota | 252/142 |
| 3,776,852 | 12/1973 | Flechter | 252/443 |
| 3,879,216 | 4/1975 | Austin | 134/28 |
| 4,124,523 | 11/1978 | Johnson | 252/145 |
| 4,181,622 | 1/1980 | Gavin | 252/143 |
| 4,238,279 | 12/1980 | Tsubai | 156/664 |
| 4,439,339 | 3/1984 | Donmit | 134/3 |
| 4,561,993 | 12/1985 | Choy | 252/140 |
| 4,581,042 | 4/1986 | Willmore | 134/3 |
| 4,780,150 | 10/1988 | Anderson | 134/3 |

FOREIGN PATENT DOCUMENTS

| 120489 | 11/1943 | Australia | 252/136 |
|---|---|---|---|
| 722622 | 11/1965 | Canada | 252/136 |
| 3613274 | 10/1987 | Fed. Rep. of Germany | 134/3 |
| 4015485 | 6/1977 | Japan | 252/144 |
| 0246 | 5/1969 | U.S.S.R. | 252/136 |
| 290458 | 5/1928 | United Kingdom | 252/136 |
| 469333 | 7/1937 | United Kingdom | 134/3 |
| 816619 | 7/1959 | United Kingdom | 252/136 |
| 1479591 | 7/1977 | United Kingdom | 252/136 |

Primary Examiner—Asok Pal
Assistant Examiner—Ourmazd Ojan
Attorney, Agent, or Firm—Charles E. Cates; Frank T. Barber

[57] ABSTRACT

This disclosure relates to a process for the removal of mineral deposits, water stains, rust, algae and other marine residue from hard surfaces, both porous and nonporous, such as ceramics, acrylics, fiberglass, plastics, marble, stainless steel, glass, aluminum, steel and other ferrous and non ferrous metals. Cleaning is effected by applying to said surfaces a viscous or gelled fluid composition containing a mineral-dissolving acid, a lubricant such as glycerin or mineral oil, and a thickening agent such as gelatin or silicon dioxide or mixtures thereof. Optional ingredients may also be present.

18 Claims, No Drawings

COMPOSITIONS AND METHODS FOR CLEANING HARD SURFACES

FIELD OF THE INVENTION

This invention relates to novel compositions for the removal of mineral deposits, water stains, rust, algae and other marine residue from hard surfaces, both porous and nonporous, and to the process for cleaning the same. This pertains to both natural and man-made bodies of water such as lakes, rivers, oceans and the like; swimming pools, fountains, spas, cooling towers, steam generators, steam boilers, tanks, condensers, heat exchangers, radiators, steam and other heaters and other various types of water containers and the pipes and connections thereof, including cooking ware, tanks and other similar surfaces made of stainless steel, brass or glass.

BACKGROUND AND PRIOR ART

It is known that various surfaces that are in continuous contact with water or constantly exposed to a high evaporation of hard water develop stains such as oxides, salts of calcium and other metals and minerals, algae and other marine vegetation, and also the use of some chemical products can leave residue of acid soluble materials. Surfaces such as tile used at the water line on swimming pools are typically made of ceramic with a clear glazed finish. Conventional cleaning of this type of surface can sometimes cause damage that is usually irreparable therefore allowing the minerals to penetrate the surface and become difficult to remove.

It has been a common method to remove such stains by using a pumice stone and/or some type of sanding cloth. This, however, can cause irreversible damage to the glaze finish thereby permitting the stains or mineral buildup to return more rapidly and more heavily. This method is a time consuming and expensive operation requiring a considerable degree of manual labor.

Fiberglass, acrylic, gelcoat, stainless steel, aluminum and other delicate surfaces are cleaned essentially in the same manner. Scrub pads of an abrasive enough nature to remove mineral staining can cause permanent scratching and other damage to said surfaces.

Glass is another example. Mineral deposits on vertical glass surfaces, for the most part, are difficult to remove adequately. The use of conventional household glass cleaners will remove dirt, grime, grease and oil but will not remove minerals. Generally speaking, the use of any type of abrasive pad can scratch glass and cause undesirable results. The anodized aluminum window frames commonly used in construction can also be damaged by abrasives. Therefore, these surfaces generally remain covered with stains until eventual replacement, which can be costly.

Finally, the widespread and increasing use of marble, especially in the construction of water features (fountains), presents unique challenges in terms of cleaning. Calcium carbonate is a primary element in much of the decorative marble used in residential and commercial building projects. The chemical similarities of marble and the mineral buildup caused by evaporation lead to special cleaning considerations. Conventional cleaning techniques involve the use of strong abrasives and/or acids often resulting in damage to the surface of the marble.

Efforts have been underway for some time to develop chemical agents for achieving the desired cleaning. Prior patents such as Muoio U.S. Pat. No. 3,681,141 and Gavin U.S. Pat. No. 4,181,622 have suggested the use of strong acids in carriers designed to aid in controlling the viscosity and fluidity of the cleaner. However, the procedures developed thus far have achieved improved cleaning at the expense of increased cost in the manufacturing of the compositions, as well as complexities caused by the need for longer manufacturing times and the use of potentially toxic materials. Further, some of the prior art compositions have been limited to applications in which the surfaces to be treated must be thoroughly dry.

It is an object of the present invention to provide a viscous or gelled fluid composition which possesses enhanced cleaning effectiveness.

It is another object of the invention to provide a composition which may be tailored from the standpoint of viscosity to meet the needs of a wide range of different cleaning applications.

It is a further object of the invention to provide a composition which may be produced from ingredients which avoid the use of long or complex manufacturing procedures.

It is a further object to provide a cleaning composition made from relatively non-toxic materials which are safer not only in their use but also in their method of manufacture.

Other objects and advantages will be apparent from the following description and examples.

SUMMARY OF THE INVENTION

This invention relates to a viscous or gelled fluid composition for cleaning hard surfaces comprising a mineral-dissolving acid, a lubricant, a gelling agent such as gelatin or silicon dioxide or mixtures thereof, and water in an amount less than about 60% of the weight of the composition. Optional other ingredients may be added to the composition. A preferred embodiment of the invention is a composition containing from 12 to 25% by weight of hydrochloric acid, 15 to 30% by weight of a lubricant such as glycerin or mineral oil, 10 to 16% by weight of a gelling agent such as gelatin or silicon dioxide or mixtures thereof, and 35 to 60% by weight of water.

The invention also relates to a method for cleaning stains or mineral deposits from hard surfaces comprising applying the above composition to the surface for a time sufficient to remove the stains or deposits and then removing the composition from the surface along with the stains or deposits.

DETAILED DESCRIPTION OF THE INVENTION

This invention is based on the discovery that a cleaning composition containing three essential components provides a combination which is unique from the standpoint of cleansing effectiveness, broad applicability, ease of manufacture, and safety.

The first component is a mineral-dissolving acid. The acid used is selected from but not limited to hydrochloric, sulfuric, hydrofluoric, nitric, phosphoric or any other mineral dissolving acid, organic or inorganic, the function of which is to remove acid soluble stains such as calcareous and salt deposits and metal oxides. Either the acid itself, or water soluble acidic salts, e.g. sodium bisulfate, can be employed. Mixtures of two or more acids can also be employed. Hydrochloric acid is preferred because of its rapid dissolving abilities with minerals even at low concentrations. The level of HCl concentration in the added acid solution may vary. The preferred is from 31 to 37% by weight. The hydrochloric acid is the active ingredient for the removal of hard water deposits. The principal constituents of these deposits are calcium and magnesium carbonate ($CaCO_3$ and $MgCO_3$). The deposits also often contain minor amounts of ferrous carbonate, ferrous and magnesium oxide, fluoride, iron, sodium and copper. When hydrochloric acid is used, the pertinent chemical reaction as it pertains to the removal of calcium carbonate is:

$$CaCO_3 + H+ = Ca2+ + OH^- + CO_2 \text{ (gas)}$$

Basically, the elevated level of the hydrogen ion (H+) dissolved in the cleaner induces a chemical reaction leading to the decomposition of calcium carbonate and dissolution of calcium as calcium ions (Ca2+) into the liquid and forming dissolved hydroxyl ions (OH−) and releasing carbon dioxide ($CO_2$) as a gas.

Hydrofluoric acid (HF) reacts strongly with most of the same minerals as hydrochloric acid and may be used in small quantities in combination with hydrochloric acid to produce enhanced activity. As a cautionary note, hydrofluoric acid is toxic as well as corrosive and should be handled with care. Used at about 1 to 12 parts by weight, at a concentration level of 1 to 10% by weight in water, it will penetrate the open porosity of the glaze of ceramic tile to help remove the minerals that have penetrated and embedded themselves into the glaze.

Typically the amount of acid employed will range from 10 to 40% by weight of the total composition taking into consideration the type of surface to be cleaned and type of minerals that are to be removed. It is preferred that the acid concentration be within the range of 12 to 25%.

The composition will contain at least one lubricant selected from glycerin or mineral oil, with glycerin ($C_3H_8O_3$) being preferred. This ingredient improves both the spreading characteristics of the composition and the residual gloss left on the surface. It also works in addition to the water as a solvent for the gelling agent and as an emollient providing protection to the skin. Glycerin is novel in that it is totally neutral to litmus and extremely soluble in acid or water.

Typically, the amount of glycerin employed will be between 5 and 40 parts by weight. Two lubricants may be used in conjunction so long as the total amount does not exceed the maximum parts per weight. The preferred concentration range for the lubricant is 15 to 30% by weight.

The composition will also contain either gelatin or silicon dioxide or mixtures thereof as a thickening agent. These substances are both soluble and stable in high acid media. Colloidal silicon dioxide ($SiO_2$) is the preferred thickening agent sold under the trademark CAB-O-SIL M5. This material is very stable in high acid media, does not change the pH of the final composition and can be used in comparatively small proportions. Gelatin, also known as a hydrocolloid, is also useful as the thickening agent. It is a complex protein compound obtained from boiling of animal tissue in water. It is soluble in glycerin and HCl and absorbs 5 to 10 times its weight of liquid. It swells and softens when immersed in water.

Typically, the amount of thickening agent used will range from 3 to 16 parts by weight of the total composition. The preferred range is 10 to 16 parts by weight.

In order to provide the fluidity and viscosity desired to practice the invention, the final composition will generally have a viscosity between about 1.73 and 76,000 centipoises, depending on the type of surface being cleaned. The centipoise readings contained herein were determined by use of a Cannon-Fenske ASTM 12445 Kinematic Viscometer Tube. Centipoise is calculated as centistokes times density. CAB-O-SIL and gelatin can be used at very low concentrations to produce the desired viscosity and fluidity and have especially good acid stability and wetting characteristics providing the compositions with outstanding resistance to dispersion in water. These compositions should have a pH ranging from about 0.01 to 2.0.

The use of dispersing agents or deflocculants, sometimes called stearic suspension media or repulsion surfactants, can be helpful in some of the more fluid compositions. When colloidal silicon dioxide is used, there is an issue concerning the size and consistency of particles and their ability to be placed into stable suspension. Optimum size is considered to be between 0.3 and 0.5 microns. However, if the solution does not remain stable, it is necessary to utilize one or more of the following dispersing agents or deflocculants: Sodium silicate, hydroxypropyl cellulose, ethanol, methanol and butanol. Other comparable products in the same category with similar properties will also be suitable. The amount of dispersing agent or deflocculant to be used is approximately 4% by weight or less.

pH indicators may be added to the solution to identify when the acid has spent its usefulness in dissolving the mineral deposits. These indicators include but are not limited to modified methyl orange, bromcresol green, methyl red, bromthymol blue, bromcresol purple, phenolphthalein and thymolphthalein. These solutions can be bought under the trade name INDICATAR. The amount of pH indicator used should range from 1 to 5 parts per weight of the final composition.

Other optional components which can be added to contribute specific characteristics or enhance the aesthetic appeal include dyes, fragrances, solvents or enzymes. The solvents and/or enzymes may be employed to break down specific compounds such as grease or oil, body oils, skin, hair, blood, glues and various other types of materials on the surface being cleaned. However, any solvent or enzyme selected must be stable in the final composition.

The novel process of the invention provides a highly convenient and rapid means for cleaning hard porous and non porous surfaces. The composition described is applied for example by spraying, squirting or by impregnated cloth or pad onto the surface to be cleaned. In the case of a body of water being present, the composition may be applied above the water line. The composition, because of its fluidity, viscosity and ability to wet hard surfaces even at lower viscosities, forms a continuous sheet of active material over the entire surface and flows uniformly down and around the surface being cleaned. The composition, when used in higher viscosities such as 76,000 centipoise, has been formed into a gel. In this state, the composition can readily be applied to any vertical, angled or inverted surface without running off. This provides a highly concentrated acid cleaner for certain problem surfaces. The cleaning compositions can, if so desired, be applied in less concentrated form becoming safer to use, yet cleaning the surface in a relatively short time. After effectively removing the stains and/or minerals it can be easily rinsed away with water.

The following procedure for preparing the composition has been found to be convenient. First, the acid or acids are introduced to the lubricant and mixed thoroughly with an impeller system acceptable to high acid media. This can be done at room temperature. The preferred amount of thickening agents are then dissolved into the mixture maintaining thorough agitation until dissolution and desired viscosity are obtained. Optional ingredients may be added at this time. It is a feature of the invention that the manufacture of the composition can be carried out rapidly, at room temperature, without the need for extraordinary conditions or equipment.

Cleaning compositions prepared in accordance with this invention are stable in storage and retain their novel characteristics for relatively long periods of time. The compositions are generally packaged in a container which is designed to facilitate their application. Because of their acidic nature the compositions are generally not placed in metal containers. A highly convenient and efficient container is a flexible plastic squeeze bottle fitted with a directional nozzle or orifice which permits accurate squirting or spraying of a stream of the composition onto the surface of the article to be cleaned.

The following examples illustrate the practice of certain specific embodiments of the invention. It will be understood that the invention is not limited to the specific materials or proportions given, but comprehends all such modifications and variations thereof as will be apparent to those skilled in the art.

EXAMPLE 1

An acid cleaning solution composed of the following ingredients was prepared in parts by weight:

| | | | |
|---|---|---|---|
| Hydrochloric acid (31.5% HCl)* | 58 | Gelatin (U.S.P.) | 8 |
| Glycerin (U.S.P.) | 30 | SiO$_2$ (CAB-O-SIL) | 4 |

*The total composition contained 18% HCl and 40% water.
The viscosity of the composition was 73.58 centipoise.

The above composition was used in cleaning hard surfaces in a number of different environments, as follows:

A: The first surface tested was dark colored, high gloss ceramic tile installed on a swimming pool at water line. The area of tile chosen was a raised bond beam area where the tile line continued approximately 18' above water. This tile had been exposed to rapid evaporation over a period of seven years and was heavily covered with hard water deposits (minerals). The tile on this swimming pool had also been previously cleaned with pumice stone which scratched the glazed surface thereby causing the deposits to return more quickly and adhere or bond themselves deep into the ceramic material. This results in a condition whereby the minerals are very difficult to remove. The solution was applied to the surface by squirting it on at the top of the exposed surface and allowing the solution to create a viscous sheet of active material on the entire surface. The material was spread to increase the cleaning area with the use of a sponge. The cleaning solution started reacting with the minerals on the tile surface immediately causing a white foaming action. This foaming action is due to the release of $CO_2$ gas which is the principal gas by-product of the chemical reaction pertinent to the removal of calcium carbonate. The solution was allowed to remain on the surface for 10 minutes. The area was then rinsed with water and sponged off. Approximately 50% of the minerals had been successfully removed. With the addition of a second coat in the same manner, equal results were achieved. Mild agitation on some areas was needed with the use of a nonabrasive pad. When the surface dried it had the appearance of new high gloss tile. Even the grout between the tile had the appearance of being like new.

B: The same solution was applied to a small sea shell covered with mineral deposits from seawater which were so thick as to obscure the color of the shell. It was applied by squirting onto the surface one (1) ounce and scrubbing with a soft bristle toothbrush. This was done for one (1) minute at which time the surface was rinsed with water and dried. The shell had no remaining minerals and had an appearance of being highly polished.

C: The same solution was applied to a polished stainless steel surface, constituting the top surface of a drinking fountain. This fountain had never been thoroughly cleaned in five years, and therefore the mineral deposits were very heavy. The solution was applied by squirting onto the surface one (1) ounce of material and spreading with a soft bristle nylon brush. When the entire surface had been completely covered the solution was left to stand for fifteen (15) minutes. At that time the surface was rinsed with water and inspected. Approximately 80% of the mineral deposits were completely removed. With the addition of the second coat in the same manner (some areas needing occasional mild agitation with the brush), the surface was completely cleaned of all stains.

D: The same solution was applied to a horizontal tile surface which was raw, unpolished 12"×12" cut marble. This was part of a 150 square foot surface area surrounding an indoor water feature (fountain) that had been running about 45 days from new. The evaporation of the large volume of water running in this fountain had caused extremely heavy mineral deposits all around the surface. One (1) ounce was poured onto a single 12" by 12" marble tile and spread evenly with a nylon brush. The solution was then allowed to stand three (3) minutes undisturbed. During the three minutes a bubbling and then a peeling reaction began to occur. When the surface was rinsed with water approximately 60% to 70% of the mineral stains had been successfully and easily removed. Another coat was added in the same manner to the remaining stains. When rinsed and dried the marble surface was mineral free with no visible damage to the marble.

E: The same solution was applied to a vertical fiberglass surface, said surface being a boat with a fiberglass hull having been stained by an accumulation of algae, minerals and other marine vegetation. The boat was removed from the water and allowed to dry completely. The solution was applied by squirting onto an area a sufficient amount to clean approximately one square foot. Mild agitation was applied with an ordinary household sponge on the area, wherein the stains were removed on contact. It is necessary to let this type of surface dry before attempted cleaning. This is due to the saturation of water in the live vegetation growing on the surface. When dried, the algae is more penetrable by the acid solution and therefore more easily removed from the fiberglass surface.

F: The same solution was applied to a brass surface both vertical and horizontal. Said surface was a brass hose bib and vacuum breaker commonly used on the outside of most buildings. Since vacuum breakers are designed to leak and these surfaces are constantly exposed to the outside elements, they take on the appearance very quickly of being old and used. If enough minerals build up on the equipment it may cause it to malfunction. The solution was applied by utilizing the squeeze bottle method, heretofore mentioned, and a nylon bristle brush. In a matter of a few seconds the surface was clean of minerals and had taken on a newer and cleaner appearance.

EXAMPLE 2

An acid cleaning solution composed of the following ingredients was prepared in parts by weight:

| Hydrochloric acid (31.5% HCl)* | 39 | Gelatin (U.S.P.) | 8 |
|---|---|---|---|
| Glycerin (U.S.P.) | 30 | SiO$_2$ (CAB-O-SIL) | 4 |
| Water* | 19 | | |

*The total composition contained 12% HCl and 46% water.
The viscosity of the composition was 1.73 centipoise.

The above composition was used in cleaning hard surfaces in a number of different environments, as follows:

A: The solution was applied to a piece of stainless steel cookware which had been washed many times over in soap and water. The results were an accumulation of hard water stains. Although the article of cookware was clean, the mineral stains decreased its aesthetic appeal. The solution was applied by spraying a stream of active material through an orifice onto the stainless steel surface. It was then wiped, rinsed with water and immediately dried. The article of cookware was completely removed of all mineral stains and had a polished appearance of being like new.

B: The same solution was applied by spraying a stream of active material through an orifice onto a vertical glass surface. The glass used was a window which had been sprayed by a sprinkling system for about two years. The surface was covered with hard water stains causing the glass to become milky in appearance. When sprayed onto the glass, this solution had an immediate reaction with the minerals and it was easy to wipe the stains off with the aid of only a sponge. The solution was then applied to the anodized aluminum frame around the window which was also covered with mineral stains. These stains were removed in much the same manner with much the same results. Both surfaces were thoroughly cleaned of hard water stains.

C: The same solution was applied in the same spraying method to a stainless steel drinking fountain with new, light mineral staining. As soon as the solution came into contact with the stains, a white foaming action ($CO_2$ release) occurred which lasted one (1) minute. When this action had disappeared, the area was then wiped, rinsed clean with water and dried. The stainless steel surface was free of any stains and appeared polished and new.

EXAMPLE 3

An acid cleaning solution composed of the following ingredients was prepared in parts by weight:

| Hydrochloric acid (31.5% HCl)* | 44 | Gelatin (U.S.P.) | 8 |
|---|---|---|---|
| Glycerin (U.S.P.) | 29 | SiO$_2$ (CAB-O-SIL) | 4 |
| Water* | 14 | Lemon Oil | 1 |

*The total composition contained 14% HCl and 44% water.
The viscosity of the composition was 46.94 centipoise.

The above composition was used in cleaning hard surfaces, as follows:

A: This solution was applied through an orifice tip fitted onto a plastic squeeze bottle providing an adjustable stream or mist. The solution was applied to glass shower doors in a household bathroom. These doors had considerable amounts of hard water stains. The solution was allowed to remain on the surface for one (1) minute wherein it was wiped and rinsed clean. The doors were no longer covered with hard water stains and appeared new. This procedure was also used on the polished aluminum frame surrounding the shower doors, and was also applied in the same manner to bathroom fixtures made of chrome plated brass, porcelain and fiberglass with virtually no variation of final results.

EXAMPLE 4

An acid cleaning solution composed of the following ingredients was prepared in parts by weight:

| Hydrochloric acid (37% HCl)* | 58 | Gelatin (U.S.P.) | 9 |
|---|---|---|---|
| Glycerin (U.S.P.) | 27 | SiO$_2$ (CAB-O-SIL) | 6 |

*The total composition contained 21% HCl and 37% water.
The viscosity of the composition was 76,000 centipoise.

The above composition was used in cleaning hard surfaces in a number of different environments, as follows:

A: This solution was applied to a vertical glass surface. This surface was a large plate glass window in a newly constructed building. The sprinkler system had sprayed the windows with water for about thirty (30) days and left calcium staining. The solution was applied with a squirt type plastic squeeze bottle onto the glass surface. Because of the viscosity of this solution (gelled), it did not run down the vertical surface. At this time a folded paper towel was used to spread the material over the surface. As this was done, there was a foaming action ($CO_2$ release) associated with every move of the towel. Everywhere the solution came in contact with the stains there was an immediate reaction. As the surface was wiped, one could feel the minerals being removed instantly. After five (5) minutes the entire surface of the window (4'×6') had been covered. The window was then rinsed with water and polished with ordinary ammonia glass cleaner. The window was completely clean and free of all stains.

B: The same solution was applied to a vertical ceramic tile surface. Said surface constitutes a white high gloss, glazed ceramic tile used at the water line in a fountain. The tile was covered with dark algae and algae stains. An attempt was made to clean the area with a nylon brush with no success. The pumps on the fountain were running; therefore water was being splashed on the surface to be cleaned. The solution was applied by squirting above the water line a sufficient amount to clean three or four 6"×6" tiles. The composition was spread by hand and the algae and algae stains were instantly removed, above and below the existing water line.

C: The same solution was applied to a vertical fiberglass surface, said surface being a boat with a fiberglass hull having been stained by an accumulation of algae, minerals and other marine vegetation. The boat was removed from the water and allowed to dry completely. The solution was applied by squirting onto an area a sufficient amount to clean approximately one square foot. Mild agitation was applied with an ordinary household sponge on the area, wherein the stains were removed on contact.

EXAMPLE 5

An acid cleaning solution composed of the following ingredients was prepared in parts by weight:

| Hydrochloric acid (31.5% HCl)* | 66 | Gelatin (U.S.P.) | 9 |
|---|---|---|---|
| Glycerin (U.S.P.) | 17 | $SiO_2$ (CAB-O-SIL) | 7 |
| Lemon Oil | 1 | | |

*The total composition contained 21% HCl and 45% water.
The viscosity of the composition was 73,400 centipoise.

The above composition was used in cleaning hard surfaces, as follows:

A: This solution was applied through an orifice tip fitted onto a plastic squeeze bottle to plastic shower doors in a household bathroom. These doors had considerable amounts of hard water stains. The solution was spread over the surface with a paper towel and allowed to remain for 30 seconds. The surface was then wiped clean with a moistened towel and dried. The doors were no longer covered with hard water stains and appeared new. This procedure was also used on the polished aluminum frames surrounding the shower doors with the same final results.

EXAMPLE 6

An acid cleaning solution composed of the following ingredients is prepared in parts by weight:

| Hydrochloric acid (37% HCl)* | 78 | $SiO_2$ (CAB-O-SIL) | 4 |
|---|---|---|---|
| Hydrofluoric acid (1% in $H_2O$)* | 12 | pH Indicator | 1 |
| Glycerin (U.S.P.) | 5 | (Mod. Methyl Orange) | |

*The composition of the HCl is 24% HCl and 49% water
The composition of the HF is .15% HF and 11.85% water
The total composition contains 24.15% acid and 60.85% water
The viscosity of the composition is 70,800 centipoise.

The above composition is used in cleaning a hard surface, as follows:

A: This solution is applied to a dark colored, high gloss ceramic tile installed on a swimming pool at the water line. This tile had been exposed to a high, rapid evaporation over a period of seven years and was heavily covered with hard water deposits. This tile had also been previously cleaned with pumice stone which scratched the glaze causing some of the minerals to adhere deep into the ceramic material. The presence of hydrofluoric acid will penetrate the porosity of the glaze and allow the solution to remove the imbedded minerals. The solution is applied to the surface by squirting through an orifice tip above the water line a sufficient amount to clean about one linear foot. It is then spread by use of a sponge to cover the area. An immediate reaction is noted as the entire area foamed ($CO_2$ gas). After 10 minutes the solution turns from its magenta color to green indicating the solution has reached a pH of 4.0 and therefore the acid has spent its usefulness in dissolving the mineral deposits. The area is rinsed and approximately 50% of the deposits are removed. Repeated applications are used to remove the remaining stains. The use of the pH indicator is helpful and unique as a time saving factor by not allowing a solution to remain on the surface when it is no longer effective.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the claims. While the invention has also been specifically described in its preferred embodiments as applying the cleaning composition to the surface being treated by spraying, squirting, brushing, mopping, rolling, by impregnated pad or cloth, etc., it is to be included in the scope of the present method to immerse the surface being treated in the composition.

What is claimed is:

1. A viscous fluid composition for cleaning hard surfaces comprising from 10 to 40 parts by weight of a mineral-dissolving acid; from 5 to 40 parts by weight of a lubricant; from 3 to 16 parts by weight of a gelling agent selected from the group consisting of gelatin, colloidal silicon dioxide and mixtures thereof; and less than about 60% by weight of water; said composition having a discosity in the range between 1.73 and 76,000 centipoises.

2. The composition of claim 1 wherein the mineral-dissolving acid is selected from the group consisting of hydrochloric, sulfuric, hydrofluoric, nitric, phosphoric and mixtures thereof.

3. The composition of claim 1 wherein the mineral-dissolving acid is furnished by use of water soluble salts thereof.

4. The composition of claim 1 wherein the lubricant is glycerin.

5. The composition of claim 1 wherein the lubricant is mineral oil.

6. The composition of claim 1 wherein the lubricant comprises from 5 to 40 parts by weight of the composition.

7. The composition of claim 1 wherein the gelling agent is used in combination with a deflocculant.

8. The composition of claim 7 wherein the deflocculant is sodium silicate.

9. The composition of claim 7 wherein the deflocculant is hydroxypropyl cellulose.

10. The composition of claim 1 wherein a pH indicator is included to signal dissipation of the acid.

11. A viscous fluid composition for cleaning hard surfaces comprising 12 to 25% by weight of a mineral-dissolving acid; 15 to 30% by weight of a lubricant; 10 to 16% of a gelling agent selected from the group consisting of gelatin, colloidal silicon dioxide and mixtures thereof; and 35 to 60% by weight of water.

12. A viscous fluid composition for cleaning hard surfaces comprising 12 to 25% by weight of hydrochloric acid, 15 to 30% by weight of glycerin; 10 to 16% by weight of a gelling agent selected from the group consisting of gelatin, colloidal silicon dioxide and mixtures thereof; 2 to 6% by weight of a deflocculant; and 35 to 60% by weight of water.

13. The composition of claim 12 wherein said hydrochloric acid is used in conjunction with up to 5% by weight of hydrofluoric acid.

14. The composition of claim 12 wherein said gelling agent comprises a mixture of from 4 to 8% by weight silicon dioxide and 6 to 10% by weight gelatin.

15. The composition of claim 12 wherein said deflocculant is a mixture of sodium silicate and hydroxypropyl cellulose.

16. The composition of claim 12 wherein modified methyl orange is included to signal dissipation of the acid.

17. A process for cleaning stains or mineral deposits from hard surfaces comprising applying the composition of claim 1 to said surface for a time sufficient to remove said stains or deposits and then removing said composition from said surface together with said stains or deposits.

18. A process for cleaning stains or mineral deposits from hard surfaces comprising applying the composition of claim 12 to said surface for a time sufficient to remove said stains or deposits and then removing said composition from said surface together with said stains or deposits.

* * * * *

UNITED STATES PATENT AND TRADEMARK OFFICE
CERTIFICATE OF CORRECTION

PATENT NO. : 4,971,631

DATED : November 20, 1990

INVENTOR(S) : Kevin D. Sallee, et al

It is certified that error appears in the above-identified patent and that said Letters Patent is hereby corrected as shown below:

In claim 1, line 30, "discosity" is changed to --viscosity--.

Signed and Sealed this

Seventh Day of April, 1992

Attest:

HARRY F. MANBECK, JR.

*Attesting Officer*  *Commissioner of Patents and Trademarks*